US012614444B2

(12) United States Patent
Oya et al.

(10) Patent No.: US 12,614,444 B2
(45) Date of Patent: Apr. 28, 2026

(54) HOUSING DEVICE, CONTROL DEVICE, NON-TRANSITORY COMPUTER-READABLE MEDIUM, AND METHOD OF DETECTING WIRELESS COMMUNICATION DEVICE IN THE HOUSING DEVICE

(71) Applicant: KABUSHIKI KAISHA TOKAI RIKA DENKI SEISAKUSHO, Aichi (JP)

(72) Inventors: Yoshiyuki Oya, Aichi (JP); Takayuki Takeda, Aichi (JP); Yuki Yokouchi, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 225 days.

(21) Appl. No.: 18/433,880

(22) Filed: Feb. 6, 2024

(65) Prior Publication Data
US 2024/0273994 A1 Aug. 15, 2024

(30) Foreign Application Priority Data
Feb. 10, 2023 (JP) ................................. 2023-019090

(51) Int. Cl.
G08B 21/24 (2006.01)
H04L 41/06 (2022.01)

(52) U.S. Cl.
CPC .............. *G08B 21/24* (2013.01); *H04L 41/06* (2013.01)

(58) Field of Classification Search
CPC ................................ G08B 21/24; H04L 41/06
See application file for complete search history.

(56) References Cited

U.S. PATENT DOCUMENTS

| | | | | |
|---|---|---|---|---|
| 11,648,912 B2* | 5/2023 | Nakashima | ............ | G07C 5/008 |
| | | | | 340/426.36 |
| 11,661,901 B2* | 5/2023 | Kosugi | .................. | F02D 41/26 |
| | | | | 701/115 |
| 2020/0219383 A1* | 7/2020 | Tieman | .................. | G08C 17/02 |
| 2022/0238993 A1* | 7/2022 | Kosugi | .............. | G07C 9/00309 |
| 2023/0043228 A1* | 2/2023 | Wisnia | .................. | B60R 25/245 |

FOREIGN PATENT DOCUMENTS

EP          3 418 985 A1      12/2018

* cited by examiner

*Primary Examiner* — Brian Wilson

(74) *Attorney, Agent, or Firm* — Greenblum & Bernstein, P.L.C.

(57) ABSTRACT
A housing defines a space in which a wireless communication device for remotely controlling a controlled device with actuation of a movable member is to be housed. An actuator is configured to actuate the movable member with motions. A communication device is configured to receive a trigger signal. A control device is configured to move the actuator in accordance with the trigger signal. The control device is configured to cause a notification device to perform notification of a fact that the wireless communication device is not housed in the space, in a case where an amount of change per unit time of a physical quantity that changes in accordance with the motions of the actuator exceeds a first threshold value.

9 Claims, 3 Drawing Sheets

HOUSING DEVICE, CONTROL DEVICE, NON-TRANSITORY COMPUTER-READABLE MEDIUM, AND METHOD OF DETECTING WIRELESS COMMUNICATION DEVICE IN THE HOUSING DEVICE

CROSS-REFERENCE TO RELATED APPLICATION

The present application is based on Japanese Patent Application No. 2023-019090 filed on Feb. 10, 2023, the entire contents of which are incorporated herein by reference.

BACKGROUND

The presently disclosed subject matter relates to a housing device equipped with a housing defining a space in which a wireless communication device for remotely controlling a controlled device with actuation of a movable member is to be housed. The presently disclosed subject matter also relates to a control device adapted to be installed in the housing device. The presently disclosed subject matter also relates to a non-transitory computer-readable medium having stored a computer program that is executable by a processor installed in the housing device. The presently disclosed subject matter also relates to a method of detecting whether the wireless communication device is housed in the space.

European Patent Publication No. 3418985 A1 discloses a housing device disposed in a cabin. The housing device includes a housing defining a space in which an electronic key, which is an example of the wireless communication device, is housed. The housing device includes an actuator capable of actuating a movable member of the electronic key. The electronic key remotely controls a locking/unlocking device, which is an example of the controlled device, by actuating the movable member. The housing device includes a communication device and a control device. When the communication device receives a lock/unlock signal from the mobile device capable of being carried by a user, the control device displaces the actuator to actuate the movable member of the electronic key. As a result, in a state where the electronic key is left in the cabin, it is possible to remotely control the operation of the locking/unlocking device with the mobile device from, for example, the outside of the cabin.

SUMMARY

It is demanded to enhance the convenience of the housing device as described above.

An illustrative aspect of the presently disclosed subject matter provides a housing device, comprising:

a housing defining a space in which a wireless communication device for remotely controlling a controlled device with actuation of a movable member is to be housed;

an actuator configured to actuate the movable member with motions;

a communication device configured to receive a trigger signal; and a control device configured to move the actuator in accordance with the trigger signal, wherein the control device is configured to cause a notification device to perform notification of a fact that the wireless communication device is not housed in the space, in a case where an amount of change per unit time of a physical quantity that changes in accordance with the motions of the actuator exceeds a first threshold value.

An illustrative aspect of the presently disclosed subject matter provides a control device adapted to be installed in a housing device equipped with a housing defining a space in which a wireless communication device for remotely controlling a controlled device with actuation of a movable member is to be housed, the control device comprising:

an interface configured to receive a trigger signal; and a processor configured to move the actuator in accordance with the trigger signal, wherein the processor is configured to cause a notification device to perform notification of a fact that the wireless communication device is not housed in the space, in a case where an amount of change per unit time of a physical quantity that changes in accordance with the motions of the actuator exceeds a first threshold value.

An illustrative aspect of the presently disclosed subject matter provides a non-transitory computer-readable medium having stored a computer program adapted to be executed by a processor adapted to be installed in a housing device equipped with a housing defining a space in which a wireless communication device for remotely controlling a controlled device with actuation of a movable member is to be housed, the computer program causing, when executed, the housing device to perform:

receive a trigger signal;

move the actuator in accordance with the trigger signal; and cause a notification device to perform notification of a fact that the wireless communication device is not housed in the space, in a case where an amount of change per unit time of a physical quantity that changes in accordance with the motions of the actuator exceeds a first threshold value.

An illustrative aspect of the presently disclosed subject matter provides a method of detecting whether a wireless communication device for remotely controlling a controlled device with actuation of a movable member is housed in a space defined by a housing included in a housing device, the method comprising:

causing the housing device to receive a trigger signal;

causing an actuator to move to actuate the movable member in accordance with the trigger signal; and causing a notification device to perform notification of a fact that the wireless communication device is not housed in the space, in a case where an amount of change per unit time of a physical quantity that changes in accordance with the motions of the actuator exceeds a first threshold value.

For example, in a case where a user who has left the vehicle while carrying the wireless communication device that shall be housed in the housing device instructs a remote control of the controlled device, the user can be notified of the fact that the wireless communication device is not housed in the housing device.

In other words, according to the configuration of each of the above illustrative aspects, it is possible to suppress the occurrence of inconvenience caused by the fact that the wireless communication device is not housed in the housing device even though a remote control system is supposed to be in operation under the condition that the wireless communication device is housed in the housing device. Whether the wireless communication device is housed in the housing device or not is determined based on the physical quantity that is to be changed in accordance with the motion of the actuator, whereas there is no particular change in the operation itself of the actuator. In other words, in order to obtain the suppression effect mentioned above, it is not necessary to introduce a physical/mechanical change to the hardware configuration of the actuator or the like. Accordingly, it is possible to enhance the convenience of the housing device in which the wireless communication device for remotely controlling the controlled device with the actuation of the movable member is housed.

DESCRIPTION OF EMBODIMENTS

Embodiments will be described in detail below with reference to the accompanying drawings. In each of the drawings referred in the following descriptions, the scale is appropriately changed in order to make each of the illustrated elements have a recognizable size.

Figure 1:
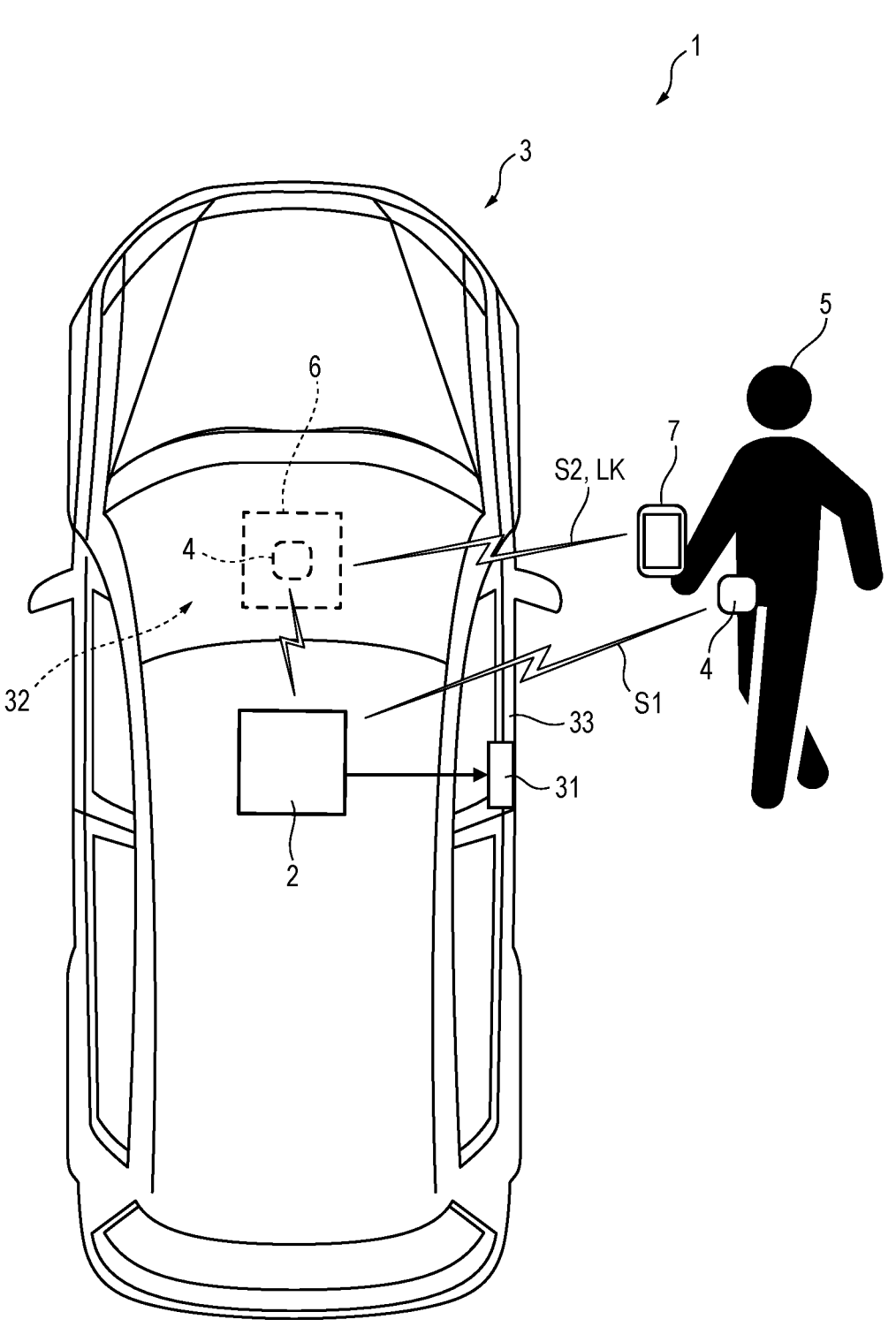
FIG. 1 illustrates a configuration of a remote control system according to one exemplary embodiment.

FIG. 1 illustrates a configuration of a remote control system 1 according to one exemplary embodiment. The remote control system 1 includes a control device 2. The control device 2 is installed in a vehicle 3. The control device 2 is configured to control operations of a locking/unlocking device 31 installed in the vehicle 3. The locking/unlocking device 31 is a device for locking/unlocking a door 33 for opening/closing a cabin 32 of the vehicle 3. The door 33 is an example of a reclosable body. The cabin 32 is an example of a space opened and closed by the reclosable body. The locking/unlocking device 31 is an example of a controlled device. The vehicle 3 is an example of a mobility.

The remote control system 1 includes an electronic key 4. The electronic key 4 is a device capable of being carried by a user 5. The electronic key 4 is a wireless communication device capable of causing the control device 2 to perform the operation control of the locking/unlocking device 31 based on first wireless communication. The first wireless communication includes transmitting and receiving a first signal S1 using a first frequency band and a second signal S2 using a second frequency band. The first frequency band and the second frequency band are different from each other. Examples of the first frequency band include a low frequency (LF) band. Examples of the second frequency band include an ultra high frequency (UHF) band. In other words, the electronic key 4 outputs information necessary for controlling the locking/unlocking device 31.

Specifically, the control device 2 transmits the first signal S1 through a communication device disposed at an appropriate position in the vehicle 3. The transmission of the first signal S1 may be performed continuously or intermittently. The electronic key 4 includes a communication device including an antenna capable of receiving the first signal S1 and transmitting the second signal S2. The electronic key 4 is configured to transmit the second signal S2 upon receiving the first signal S1. The second signal S2 is configured to include authentication information required for the authentication of the electronic key 4. The authentication information is information capable of specifying at least one of the electronic key 4 and the user 5.

The control device 2 is configured to execute authentication processing upon reception of the second signal S2 through a communication device disposed at an appropriate position in the vehicle 3. Specifically, the control device 2 is configured to match the authentication information included in the second signal S2 with authentication information of the electronic key 4 housed in a storage device (not illustrated) in advance. In a case where the matching degree between the two information items exceeds a threshold value, the control device 2 determines that the authentication of the electronic key 4 is approved.

The control device 2 is configured to output an enablement signal EN for enabling the locking/unlocking device 31 to perform the locking/unlocking operation, in a case where it is determined the approval of the authentication of the electronic key 4. For example, the locking/unlocking device 31 may be configured to perform the locking/unlocking of the door 33 when the user 5 touches a touch sensor provided on a door handle in a state where the enablement signal EN is accepted.

In other words, when the user 5 carrying the electronic key 4 enters an area capable of receiving the first signal S1, the authentication of the electronic key 4 is performed through the first wireless communication. When the authentication is approved, the user 5 can lock/unlock the door 33 without performing an operation such as inserting a key into a key cylinder and rotating the same.

The remote control system 1 includes a housing device 5. The housing device 5 is configured to be disposed in the cabin 32 of the vehicle 3. The housing device 6 is configured to house the electronic key 4. In other words, the electronic key 4 can be disposed in the cabin 32.

Figure 2:
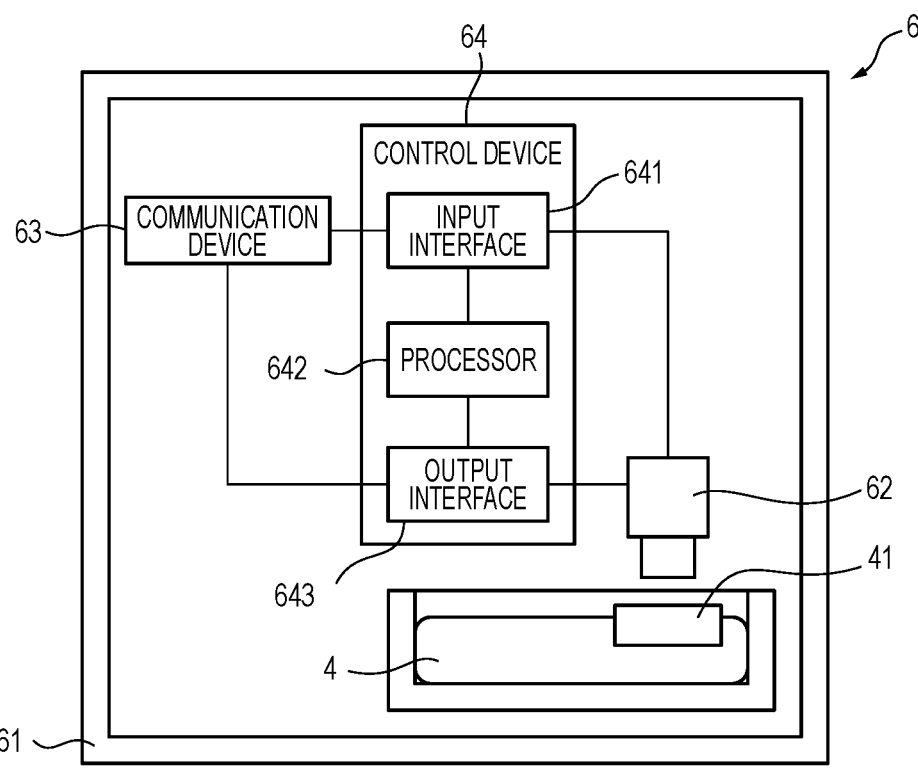
FIG. 2 illustrates a configuration of a housing device of FIG. 1.

As illustrated in FIG. 2, the housing device 6 includes a housing 61. The housing 61 is formed of a material capable of transmitting at least the second signal S2. The housing 61 defines a space in which the electronic key 4 is housed.

The housing device 6 includes an actuator 62. The actuator 62 is configured to be capable of actuating, with motions, the movable member 41 of the electronic key 4 housed in the housing 61. The electronic key 4 is configured to transmit the second signal S2 when a prescribed actuation is performed with respect to the movable member 41, regardless of the reception state of the first signal S1. The movable member 41 can be implemented by a button, a lever, or the like. The actuator 62 may be implemented by a solenoid, a cam mechanism, a rack-and-pinion mechanism, or the like. Examples of the actuation of the movable member 41 for transmitting the second signal S2 to the electronic key 4 include at least one depression and the like.

The housing device 6 includes a communication device 63. The communication device 63 includes an antenna for performing the second wireless communication with a mobile device 7. As illustrated in FIG. 1, the mobile device 7 is a device adapted to be carried by the user 5. Examples of the mobile device 7 include a generic portable information terminal such as a smartphone. In this example, the second wireless communication is short-range wireless communication.

As used herein, the term "short-range wireless communication" means wireless communication performed in accordance with IEEE 802.15 or IEEE 802.11 standards.

Examples of the technology capable of executing such wireless communication include Bluetooth (registered trademark), Bluetooth Low Energy (registered trademark), UWB (Ultra Wide Band), ZigBee (registered trademark), and Wi-Fi (registered trademark). As used herein, the term "short-range wireless communication" is distinguished from "near field wireless communication" performed with a non-contact communication technique in which a mobile device transmits information upon reception of minute power from a radio wave transmitted from a reading device. Examples of the technique capable of executing the near field wireless communication include an RF-ID and an NFC.

When it is desired to lock/unlock the door 33 of the vehicle 3 in a state where the electronic key 4 is housed in the housing device 6, the user 5 performs a prescribed actuation with respect to the mobile device 7. As illustrated in FIG. 1, the mobile device 7 is configured to transmit a lock/unlock signal LK based on the prescribed actuation. The communication device 63 of the housing device 6 is configured to be capable of receiving the lock/unlock signal LK. The lock/unlock signal LK is an example of a trigger signal.

As illustrated in FIG. 2, the housing device 6 includes a control device 64. The control device 64 is configured to control the motions of the actuator 62.

Figure 3:
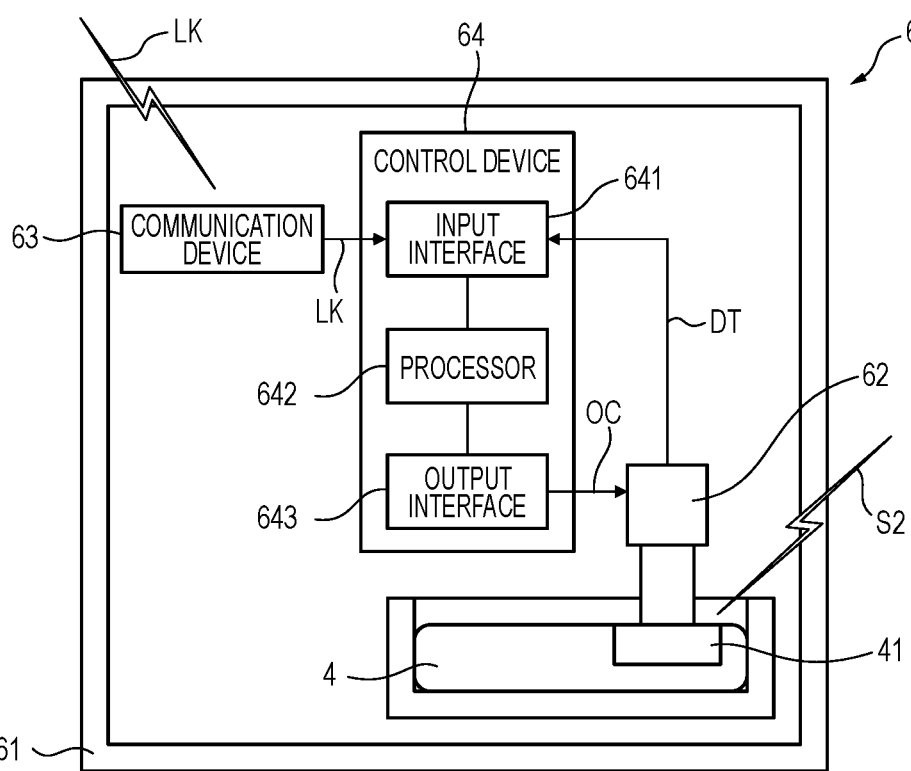
FIG. 3 illustrates an exemplary operation of the housing device of FIG. 2.

The control device 64 includes an input interface 641. As illustrated in FIG. 3, the input interface 641 is configured as a hardware interface for receiving the lock/unlock signal LK from the communication device 63. Instead of the lock/unlock signal LK, a reception signal indicating that the communication device 63 has received the lock/unlock signal LK may be accepted by the input interface 641.

The lock/unlock signal LK may be an analog signal or a digital signal in accordance with the specification of the communication device 63. In a case where the lock/unlock signal LK is an analog signal, the input interface 641 includes an appropriate conversion circuit including an A/D converter. This description may be similarly applied to other signals capable of being accepted by the input interface 641.

The control device 64 includes a processor 642 and an output interface 643. The processor 642 is configured to output, from the output interface 643, an operation control signal OC for causing the actuator 62 to perform an actuation of the movable member 41 in order to cause the electronic key 4 to transmit the second signal S2 when the input interface 641 receives the lock/unlock signal LK.

The output interface 643 is configured as a hardware interface capable of outputting the operation control signal OC. The operation control signal OC may be an analog signal or a digital signal in accordance with the specification of the actuator 62. In a case where the operation control signal OC is an analog signal, the output interface 643 includes an appropriate conversion circuit including a D/A converter. This description may be similarly applied to other signals capable of being outputted by the output interface 643.

As illustrated in FIG. 2, the actuator 62 according to the present example is initially opposed to the movable member 41 of the electronic key 4 with a gap therebetween. When the operation control signal OC is inputted from the control device 64, the actuator 62 is displaced so as to perform a prescribed actuation with respect to the movable member 41, as illustrated in FIG. 3. In other words, when the communication device 63 receives the lock/unlock signal LK, the second signal S2 is transmitted from the electronic key 4.

The second signal S2 transmitted from the electronic key 4 is received by the control device 2 installed in the vehicle 3. As described above, when the second signal S2 is received, the control device 2 performs the authentication processing of the electronic key 4, and outputs the enablement signal EN for enabling the locking/unlocking device 31 to lock/unlock the door 33.

Accordingly, when the user 5 transmits the lock/unlock signal LK from the mobile device 7 in the state where the electronic key 4 is housed in the housing device 6 disposed in the cabin 32, the door 33 can be locked/unlocked. In other words, the user 5 can lock/unlock the door 33 with a prescribed operation with respect to the mobile device 7 from outside the cabin 32 without carrying the electronic key 4.

The control device 64 is configured to monitor a level of a voltage supplied from a power source (not illustrated) for driving the actuator 62. The voltage is an example of a physical quantity that changes with the motion of the actuator. Specifically, a detection signal DT corresponding to a drive voltage level is accepted by the input interface 641.

Figure 4:
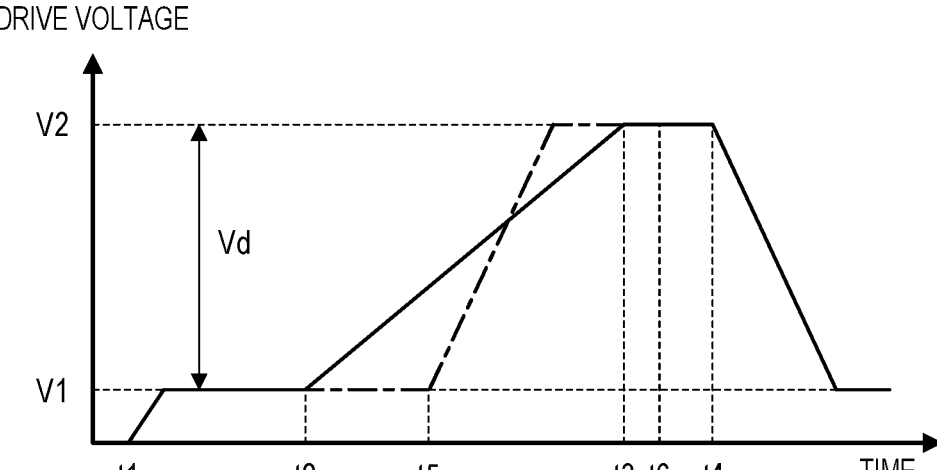
FIG. 4 illustrates changes with time of a drive voltage level in accordance with motions of an actuator of FIG. 2.

FIG. 4 illustrates a change with time in the drive voltage level caused by the motion of the actuator 62. When the operation control signal OC is inputted at a time point t1, the drive voltage level rises to a first value V1 in order to initiate the motion of the actuator 62. The first value V1 is maintained until the actuator 62 contacts the movable member 41 of the electronic key 4.

When the actuator 62 contacts the movable member 41 at a time point t2, a resistance to the motion is generated. Since the actuator 62 actuates the movable member 41 against the resistance, the drive voltage level gradually rises.

When the movable member 41 reaches a motion limit position at a time point t3, the actuator 62 is disabled to perform an additional motion. As a result, the resistance to the motion of the actuator 62 is maximized, so that the drive voltage level reaches a second value V2.

When the actuation with respect to the movable member 41 is canceled at a time point t4, the actuator 62 performs a motion for returning to the initial state. As the resistance to the actuator 62 decreases, the drive voltage level decreases from the second value V2 to the first value V1.

Figure 5:
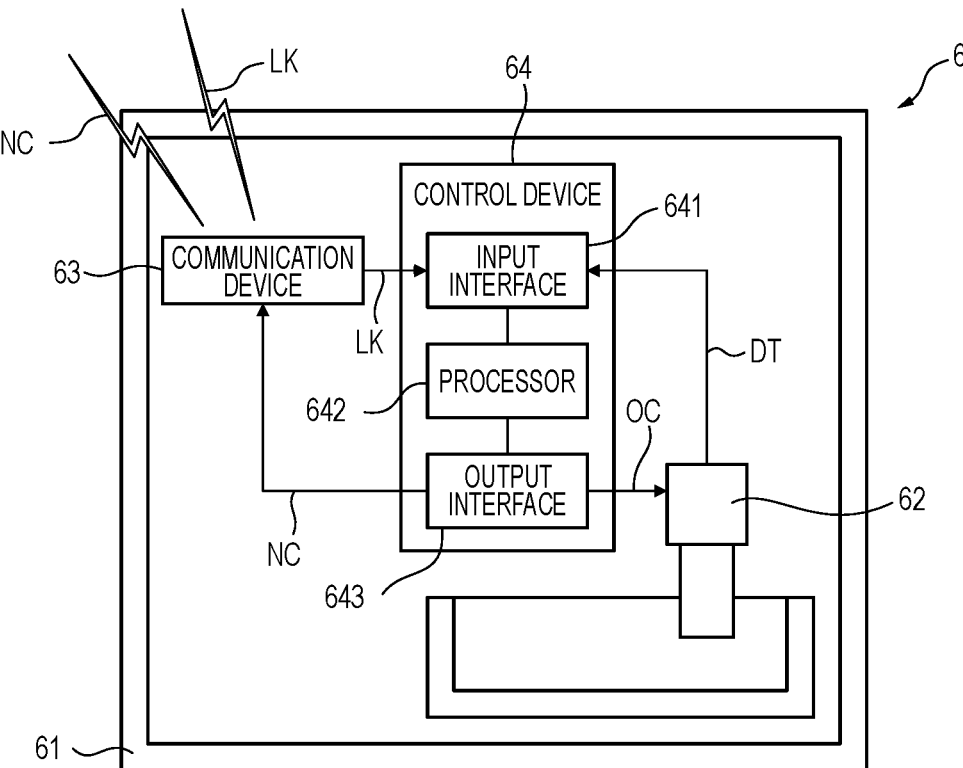
FIG. 5 illustrates another exemplary operation of the housing device of FIG. 2.

FIG. 5 illustrates a state where the operation control signal OC is inputted to the actuator 62 even though the electronic key 4 is not housed in the housing device 6. The actuator 62 reaches the motion limit position without actuating the movable member 41. The motion limit position can be defined by, for example, an appropriately provided stopper.

The change with time in the drive voltage of the actuator 62 in the state illustrated in FIG. 5 is illustrated with dashed lines in FIG. 4. Since the movable member 41 is not located at the position of the actuator 62 at the time point t2, no resistance to the motion of the actuator 62 is generated, so that the drive voltage level maintains the first value V1. Due to the absence of the resistance, the actuator 62 reaches the motion limit position earlier than the case where the movable member 41 is present.

When the actuator 62 reaches the motion limit position at a time point t5, the actuator 62 is disabled to perform an additional motion. Accordingly, the resistance to the motion of the actuator 62 is maximized, so that the drive voltage level reaches the second value V2.

Since the actuator 62 is moved while being subjected to buffering by the movable member 41, the increase in the drive voltage level of the actuator 62 in the case where the electronic key 4 is housed in the housing device 6 is slower than the case where the electronic key 4 is not housed in the housing device 6. In other words, the amount of change per unit time of the drive voltage of the actuator 62 in the case where the electronic key 4 is not housed in the housing device 6 is larger than the amount of change in the case where the electronic key 4 is housed in the housing device 6.

The processor 642 of the control device 64 is configured to determine that the electronic key 4 is not housed in the housing device 6 in a case where the amount of change in the drive voltage level per unit time caused by the motion of the actuator 62 based on the lock/unlock signal LK exceeds a threshold value.

In addition, the processor 642 is configured to output a notification control signal NC from the output interface 643 in a case where it is determined that the electronic key 4 is not housed in the housing device 6. The notification control signal NC is transmitted from the communication device 63 to the mobile device 7. The notification control signal NC is configured to cause the mobile device 7 to perform a notification indicating that the electronic key 4 is not housed in the housing device 6.

In other words, in a case where the amount of change in the drive voltage level per unit time caused by the motion of the actuator 62 based on the lock/unlock signal LK exceeds a first threshold value, the processor 642 causes the mobile device 7 to notify that the electronic key 4 is not housed in the housing device 6. The notification may be performed with at least one of a visual notification, an audio notification, and a tactile notification. The mobile device 7 is an example of a notification device.

For example, in a case where the user 5 who has left the vehicle while carrying the electronic key 4 that shall be housed in the housing device 6 instructs unlocking of the door 33 with the mobile device 7, the user 5 can be notified of the fact that the electronic key 4 is not housed in the housing device 6, through the mobile device 7.

In other words, according to the configuration of the present exemplary embodiment, it is possible to suppress the occurrence of inconvenience caused by the fact that the electronic key 4 is not housed in the housing device 6 even though the remote control system 1 is supposed to be in operation under the condition that the electronic key 4 is housed in the housing device 6. Whether the electronic key 4 is housed in the housing device 6 or not is determined based on the drive voltage level that is to be changed in accordance with the motion of the actuator 62, whereas there is no particular change in the operation itself of the actuator 62. In other words, in order to obtain the suppression effect mentioned above, it is not necessary to introduce a physical/mechanical change to the hardware configuration of the actuator 62 or the like. Accordingly, it is possible to enhance the convenience of the housing device 6 in which the electronic key 4 for remotely controlling the locking/unlocking device 31 with the actuation of the movable member 41 is housed.

The processor 642 of the control device 64 may be configured to notify the mobile device 7 of the fact that the electronic key 4 is not housed in the housing device 6 in a case where the amount of change per unit time of the drive voltage level of the actuator 62 exceeds the first threshold value and the amount of change in the drive voltage level exceeds a second threshold value after a prescribed time period elapses from the reception of the lock/unlock signal LK. The second threshold value may be a value corresponding to the potential difference Vd of the drive voltage level illustrated in FIG. 4.

According to such a configuration, in a case where the drive voltage level of the actuator 62 exhibits an unexpected large change in a short time due to electrical noise or the like, it is possible to suppress the occurrence of a situation where the absence of the electronic key 4 in the housing device 6 is notified based on such change.

The processor 642 of the control device 64 having various functions described above can be implemented by an exclusive integrated circuit such as a microcontroller, an ASIC, and an FPGA equipped with a storage element in which a computer program for executing the functions is pre-installed. The memory element is an example of a non-transitory computer-readable medium having stored a computer program.

The processor 642 may be implemented by a generic microprocessor operating in cooperation with a generic memory. Examples of the generic microprocessor include a CPU, an MPU, and a GPU. Examples of the generic memory include a ROM and a RAM. In this case, a computer program for executing the functions can be stored in the ROM. The generic memory is an example of a non-transitory computer-readable medium having recorded a computer program. The generic microprocessor designates at least a part of the program stored in the ROM, loads the program on the RAM, and executes the processing described above in cooperation with the RAM. The processor 642 may be implemented by a combination of the exclusive integrated circuit and the generic microprocessor.

Each configuration described above is merely illustrative for facilitating understanding of the presently disclosed subject matter. Each of the above exemplary configurations can be appropriately modified or combined with another exemplary configuration within the teaching of the presently disclosed subject matter.

In the above exemplary embodiment, the absence of the electronic key 4 in the housing device 6 is detected based on the drive voltage level of the actuator 62. However, an appropriate physical quantity can be monitored by the processor 642 as long as the physical quantity changes with the motion of the actuator 62. For example, instead of the drive voltage level of the actuator 62, the driving current level may be monitored. Alternatively, if the motion of the actuator 62 is detected magnetically or optically, a magnetic or optical parameter that may be changed with the motion of the actuator 62 may be monitored.

In the above exemplary embodiment, the absence of the electronic key 4 in the housing device 6 is detected based on a change in the drive voltage level caused by the arrival of the actuator 62 itself at the motion limit position. However, the absence of the electronic key 4 in the housing device 6 may be detected based on a change in the drive voltage level caused by the contact of the actuator 62 with a stable structure such as a bottom wall in the housing 61. The amount of change per unit time of the drive voltage level caused by the contact of the actuator 62 with such a stable structure is larger than the amount of change per unit time of the drive voltage level when the actuator 62 actuates the movable member 41 of the electronic key 4.

The electronic key 4 may be equipped with multiple movable members. For example, there may be provided a movable member to be actuated for outputting a second signal S2 for causing the locking/unlocking device 31 to be locked, and a movable member to be actuated for outputting a second signal S2 for causing the locking/unlocking device 31 to be unlocked.

In this case, the housing device 6 includes multiple actuators 62 for actuating respective movable members. The absence of the electronic key 4 can be performed when any of the actuators 62 is moved.

In the above exemplary embodiment, the absence of the electronic key 4 is detected with the motion of the actuator 62 based on the lock/unlock signal LK transmitted from the mobile device 7 carried by the user 5. However, the absence of the electronic key 4 may be detected with another signal as a trigger.

As an example, when the user 5 performs an appropriate input to a device disposed in the cabin 32, a confirmation signal that can be accepted by the communication device 63 of the housing device 6 may be transmitted from the device. Upon the reception of the confirmation signal by the communication device 63, the control device 64 may move the actuator 62 in the same manner as in the case of the lock/unlock signal LK, thereby confirming the absence of the electronic key 4. In this case, the confirmation signal is an example of the trigger signal. According to such a configuration, it is possible to confirm whether the electronic key 4 is housed in the housing device 6 at an arbitrary timing even in the cabin 32.

As another example, the remote control system 1 may include a management device capable of communicating with the housing device 6 via a wireless communication network. For instance, when a user who manages the electronic key 4 performs an appropriate input to the management device, a confirmation signal that can be accepted by the communication device 63 of the housing device 6 may be transmitted from the device. Upon the reception of the confirmation signal by the communication device 63, the control device 64 may move the actuator 62 in the same manner as in the case of the lock/unlock signal LK, thereby confirming the absence of the electronic key 4. In this case, the confirmation signal is an example of the trigger signal. According to such a configuration, it is possible to confirm whether the electronic key 4 is housed in the housing device 6 at an arbitrary timing from the outside of the vehicle 3.

In the above exemplary embodiment, it is notified of the fact that the electronic key 4 is absent in the housing device 6 through the mobile device 7 carried by the user 5. However, as long as the notification control signal NC can be received from the communication device 63 of the housing device 6, the notification may be performed through another device. Examples of such another device include a device installed in the vehicle 3 and having a notification capability, as well as a device capable of communicating with the housing device 6 via a wireless communication network and having a notification capability.

In the above exemplary embodiment, the electronic key 4 housed in the housing device 6 is remotely controlled based on the lock/unlock signal LK transmitted from the mobile device 7 to perform the locking/unlocking of the door 33 of the vehicle 3 with the locking/unlocking device 31. As a result, it is possible to enhance the security of the cabin 32 opened/closed by the door 33. In addition, it is possible to enhance the security of the vehicle 3 that is a mobility susceptible to theft.

However, the mobility in which the control device 2 and the locking/unlocking device 31 are installed is not limited to the vehicle 3. Examples of another mobility include railways, aircrafts, and ships. Such mobility may not require a driver.

In addition, the reclosable body to be locked/unlocked by the locking/unlocking device is not limited to the door 33 of the vehicle 3. Doors and windows in houses and facilities may also be an example of the reclosable body. In this case, it is possible to enhance the security of the space to be opened/closed by the reclosable body.

The controlled device whose operation is controlled by the electronic key 4 through the remote control from the mobile device 7 is not limited to the locking/unlocking device 31 installed in the vehicle 3. The operation of an ignition power source, an anti-theft device, or the like of the vehicle 3, as well as a security device, a lighting device, an air conditioner, an audio-visual device, or the like of the above-described house or facility can be appropriately controlled. The signal transmitted from the mobile device 7 for causing each of these controlled devices to operate may be an example of the trigger signal.

Items listed below also constitutes a part of the presently disclosed subject matter:

Item 1: A housing device, comprising:

a housing defining a space in which a wireless communication device for remotely controlling a controlled device with actuation of a movable member is to be housed;

an actuator is configured to actuate the movable member with motions;

a communication device configured to receive a trigger signal; and a control device configured to move the actuator in accordance with the trigger signal, wherein the control device is configured to cause a notification device to perform notification of a fact that the wireless communication device is not housed in the space, in a case where an amount of change per unit time of a physical quantity that changes in accordance with the motions of the actuator exceeds a first threshold value.

Item 2: The housing device according to item 1, wherein the control device is configured to cause the notification device to perform the notification, in a case where the amount of change per unit time exceeds the first threshold value, and the amount of change per unit time exceeds a second threshold value after a prescribed time period is elapsed from when the trigger signal is received.

Item 3: The housing device according to item 1 or 2, wherein the trigger signal is received from a mobile device that is adapted to be carried by a user.

Item 4: The housing device according to any one of items 1 to 3, wherein the notification device is a mobile device that is adapted to be carried by a user.

Item 5: The housing device according to any one of items 1 to 4, wherein the housing device is adapted to be disposed in a space that is to be opened/closed by a reclosable body; and wherein the controlled device includes a locking/unlocking device configured to lock/unlock the reclosable body.

Item 6: The housing device according to item 5, wherein the reclosable body is a part of a mobility.

The invention claimed is:

1. A housing device, comprising:

a housing defining a space in which a wireless communication device for remotely controlling a controlled device with actuation of a movable member is to be housed;

an actuator configured to actuate the movable member with motions;

a communication device configured to receive a trigger signal; and a control device configured to move the actuator in accordance with the trigger signal, wherein the control device is configured to cause a notification device to perform notification of a fact that the wireless communication device is not housed in the space, in a case where an amount of change per unit time of a physical quantity that changes in accordance with the motions of the actuator exceeds a first threshold value.

2. The housing device according to claim 1, wherein the control device is configured to cause the notification device to perform the notification, in a case where the amount of change per unit time exceeds the first threshold value, and the amount of change per unit time exceeds a second threshold value after a prescribed time period is elapsed from when the trigger signal is received.

3. The housing device according to claim 1, wherein the trigger signal is received from a mobile device that is adapted to be carried by a user.

4. The housing device according to claim 1, wherein the notification device is a mobile device that is adapted to be carried by a user.

5. The housing device according to claim 1, wherein the housing device is adapted to be disposed in a space that is to be opened/closed by a reclosable body; and wherein the controlled device includes a locking/unlocking device configured to lock/unlock the reclosable body.

6. The housing device according to claim 5, wherein the reclosable body is a part of a mobility.

7. A control device adapted to be installed in a housing device equipped with a housing defining a space in which a wireless communication device for remotely controlling a controlled device with actuation of a movable member is to be housed, the control device comprising:

an interface configured to receive a trigger signal; and a processor configured to actuate the movable member with motions of the actuator in accordance with the trigger signal, wherein the processor is configured to cause a notification device to perform notification of a fact that the wireless communication device is not housed in the space, in a case where an amount of change per unit time of a physical quantity that changes in accordance with the motions of the actuator exceeds a first threshold value.

8. A non-transitory computer-readable medium having stored a computer program adapted to be executed by a processor adapted to be installed in a housing device equipped with a housing defining a space in which a wireless communication device for remotely controlling a controlled device with actuation of a movable member is to be housed, the computer program causing, when executed, the housing device to perform:

receive a trigger signal;

actuate the movable member with motions of the actuator in accordance with the trigger signal; and cause a notification device to perform notification of a fact that the wireless communication device is not housed in the space, in a case where an amount of change per unit time of a physical quantity that changes in accordance with the motions of the actuator exceeds a first threshold value.

9. A method of detecting whether a wireless communication device for remotely controlling a controlled device with actuation of a movable member is housed in a space defined by a housing included in a housing device, the method comprising:

causing the housing device to receive a trigger signal;

causing motions of an actuator to actuate the movable member in accordance with the trigger signal; and causing a notification device to perform notification of a fact that the wireless communication device is not housed in the space, in a case where an amount of change per unit time of a physical quantity that changes in accordance with the motions of the actuator exceeds a first threshold value.

* * * * *